June 2, 1936.  O. P. M. GOSS ET AL  2,042,839
METHOD OF MANUFACTURING LUMBER
Filed May 28, 1934
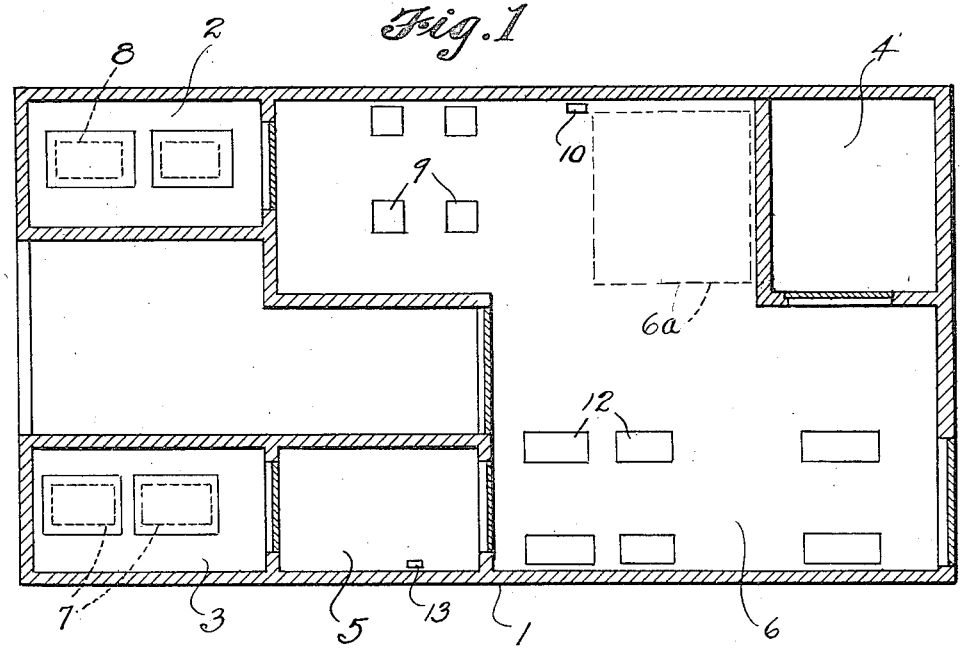
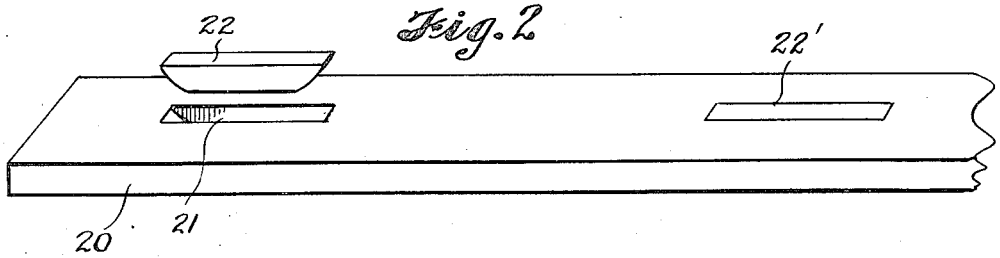
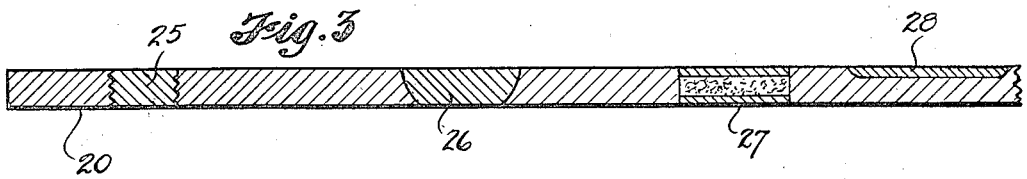
INVENTOR
OLIVER P. M. GOSS
WORTH C. GOSS
BY
Cook & Robinson
ATTORNEY Patented June 2, 1936

2,042,839

UNITED STATES PATENT OFFICE 2,042,839

METHOD OF MANUFACTURING LUMBER

Oliver P. M. Goss and Worth C. Goss, Seattle, Wash., assignors to Carlisle Lumber Company, a corporation of Washington Application May 28, 1934, Serial No. 727,862

6 Claims. (Cl. 144—309)

This invention relates to a method of manufacturing lumber and particularly lumber which, in the process of its manufacture, is improved in grade, appearance and usefulness by the removal therefrom of knots, pitch pockets, scars, stains and other defects and repaired by the application of patch pieces or plugs to the recesses resulting from the removal of the defective portions; the invention having reference in particular to a method of manufacturing lumber of that character disclosed in our co-pending application, filed December 20, 1933 under Serial No. 703,226, but is applicable also to the repairing of lumber according to the disclosures in U. S. patent to Leash, No. 1,594,739; U. S. patent to Story, No. 276,499; U. S. patent to Loetscher, No. 1,703,890; U. S. patent to Maurer No. 1,838,426; or to other operations wherein patches or plugs are applied for the repairing of lumber or wood panels.

Explanatory to the present invention, it will be explained that, heretofore, the manufacture of lumber or the repair of lumber in accordance with the disclosures of any of the above mentioned patents, has been carried on without much, if any, regard to any definite conditioning of the pieces, especially with respect to their moisture content. As a result, it happens that the joints between many of the patch pieces or plugs and the pieces to which they are applied become open. Also in many instances splitting of the piece results. For example, if a board is improved by the removal of a defective portion and by fitting a patch or plug to the recess; which plug or patch has a relatively high moisture content as compared to that of the board, and should the board then be placed in use where the patch or plug finally dries out to the same moisture content as the board, it will, by reason of shrinkage in drying, become so loose as to be ineffective, unsightly or otherwise undesirable. Likewise, if patches of low moisture content are applied to boards of a much greater content of moisture, shrinkage of the board when later put into use will be to a greater extent than that of the patch and will cause the board to split; it being understood in each example given, that the patch pieces of plugs when applied are fitted snugly to the board recesses.

In our co-pending application above mentioned we have stated the desirability of drying the patch pieces to a slightly lesser degree of moisture content than that of the pieces to which they are to be applied in order to maintain tight joints between the patches and board. This disclosure anticipates application of the patches to the boards immediately following their periods of conditioning so that there will be no opportunity for any material change in their dimensions by reason of changed atmospheric conditions. It has been found, however, that it is not always convenient or desirable to follow that procedure of immediate assembly and that generally it is more economical and more practical to separately prepare and condition the patches or plugs and the lumber and to maintain them in storage until ready for assembly. This is not feasible, however, unless such control is maintained over the atmospheric conditions in which the pieces are stored that they will maintain their prepared condition without change in dimensions. Manifestly, there would be no object in accurately dimensioning the plugs, patches or recesses in one condition of atmosphere and then storing them in a changed condition which would cause physical change in their prepared dimensions.

In view of the above, it has been the principal object of this invention to provide a method of manufacturing patched or, what may be called, improved lumber, that is practical and economical for large operations, and which insures the continued integrity of the finished joints regardless of conditions of weather, temperature or humidity to which they may in use be subjected, and which will overcome the possibility of splitting the pieces by reason of shrinkage or expansion of either piece.

It is a further object of this invention to provide a method of manufacturing lumber which contemplates: first, the accurate conditioning of both the material to be patched and that from which the patches are to be made; second, the formation of the patch pieces from the selected and conditioned material in a controlled atmosphere whereby it is maintained at that condition; third, the storage of the patches or plugs in a controlled atmosphere to prevent any physical change in their final shape or dimension; and fourth, it contemplates the recessing of the lumber and immediately applying the patches thereto in a controlled atmosphere which insures the conditions required, necessary for a proper joint.

Other objects reside in the sequence of steps recited in carrying out the method embodying the invention.

In the accompanying drawing, Fig. 1 is a view diagrammatically illustrating one arrangement of means whereby the method embodied in this invention may be carried out.

Fig. 2 is a perspective view, illustrating a piece of recessed lumber with a patch piece ready for application thereto and showing also a patch applied to a recess.

Fig. 3 is a sectional view of a piece of lumber to which patches of different kind have been applied.

It is to be understood that the present method is applicable to repair of lumber regardless of the shape or mode of application of the repair piece and is not to be confined to use of any particular kind or arrangement of dry kilns and other apparatus used in practising the method, and that the present drawing is merely for purpose of better explanation of the operation of method claimed.

Referring more in detail to the drawing—

1 designates, in plan, a building or enclosed area in which the manufacture of lumber according to this invention may be carried out. This building comprises, at one end, dry kilns 2 and 3, and interiorly it is divided by suitable partitions to provide the enclosure 4 at one side and an enclosure 5 at the other side, leaving a relatively large working area 6.

In carrying out the processes, the lumber that is to be improved or repaired, is preferably loaded onto the usual trucks 7 and is located in the dry kiln 3 for conditioning and is therein reduced to a desired moisture content under controlled conditions of temperature, humidity and air circulation. The type of construction of the dry kiln and kind of its control devices are immaterial so long as the lumber is brought satisfactorily to the proper condition of dryness. Dry kilns of the type shown in U. S. Patents No. 1,541,350 or No. 1,680,013 may be satisfactorily employed for this purpose and the same type of control instruments as shown in the first mentioned patent may be used for control of humidity.

Likewise, the stock from which the patches are to be made, is loaded onto trucks 8 and placed in dry kiln 2 for conditioning and is therein reduced to a definite moisture content under control of suitable instruments as used in kiln 3.

The degree of moisture content to which the materials are reduced differs for the different kinds of lumber being treated. For example, "common" lumber should be dried to contain approximately sixteen per cent of moisture, while "clear" stock should be dried to approximately eight per cent of moisture. The stock for the patch pieces to be applied to "common" and "clear" lumber should be dried, respectively, to approximately twelve per cent and five per cent moisture content. Definite relations are also set for various other grades and for different kinds of woods with the patch pieces containing the lesser percentage of moisture content.

When the patch or plug stock has been properly dried, it is advanced from the kiln 2 into the working area 6 in which atmospheric conditions are so controlled that the stock and patch pieces prepared therefrom will be maintained in their prepared condition without any change. The patch pieces, in desired size and shape, are made from the conditioned stock by machines of suitable kind.

A suitable machine for making one kind of plug is shown in U. S. patent to Leash No. 1,685,366. For another kind of patch, U. S. Patent No. 1,816,853, and for still another type is that of our co-pending application Serial No. 667,219, now patented as Patent Number 1,976,722, dated Oct. 16, 1934. The machines for this purpose are designated at 9 in Fig. 1.

The prepared plugs or patches may then be stored in the area 6, as in the area inclosed by the dotted rectangle 6a. This area is within the controlled area 6, which as stated, is maintained at a predetermined atmospheric condition to maintain the plug stock against change. This may be accomplished by use of humidity control means, as designated at 10, of any suitable character.

When the lumber that is to be repaired or improved, has been dried to a definite moisture content, it is removed from the kiln 3 and moved into area 6.

If it is not desired to repair the lumber immediately, it can be stored in the compartment 5 which is maintained at a definite and predetermined atmospheric condition by use of suitable control devices, such as designated at 13 to prevent change in the prepared condition of the lumber. Preparatory to applying the patch pieces to the lumber, the defects in the lumber are removed. This may be done by boring machines, as illustrated in U. S. Patent No. 1,838,426, or by that of our co-pending application Serial No. 703,227, now patented as Patent Number 1,973,204, dated Sept. 11, 1934. Recesses of accurate dimensions are thereby formed, or this might also be done in other ways or by use of the machine of our co-pending application, Serial No. 670,090, now patented as Patent Number 1,995,505, dated March 26, 1935.

Formation of the recesses in the lumber must be done immediately on taking it into area 6, and then immediately after the recesses are properly prepared, the plugs or patches are brought from storage in room 6 and are fitted or pressed therein. In some instances, the patches are threaded into the recesses; in other instances, they are merely pressed in; and in still other operations, are glued and pressed in. In each instance the plug or patch snugly fits the recess to which it is applied so as to avoid any noticeable joint between the two.

The invention contemplates that the lumber shall be recessed and the patch pieces applied to the recesses while the lumber is in the rough or blanked, and that after application of the patch pieces the lumber will be passed through the usual planer for surfacing. Thus providing that the surfaces of the patch pieces and of the board will be exactly even.

If it is desired to run through two different kinds or grades of lumber at the same time, storage of plugs for one grade, is available in room 4 in which a different atmospheric condition from that of room 6 might be maintained.

In Fig. 2, 20 designates a board prepared with recesses 21. A patch piece 22 is shown in position for application to a recess and at 22' is a patch in place. In Fig. 3, a board 20 is shown in cross section with various forms of patches applied. 25 designates a plug that is threaded into a recess prepared therefor in accordance with the Leash Patent No. 1,594,739. At 26 is a tapered plug or patch pressed into a recess, as in our co-pending application. At 27 are patch pieces pressed into a recess from opposite sdies of the board, and at 28 is a surface patch, as used by Rockwell in U. S. Patent No. 1,552,954. In each instance, the patch pieces, when applied by the present method, are reduced first to a definite percentage of moisture content and are applied to the piece 20 after it has been properly conditioned and while containing a definite percentage of moisture, which is just slightly greater than that of the plug or patch.

It is to be understood that the particular arrangement of means for carrying out the process of manufacture is immaterial so long as it permits of a satisfactory carrying out of the operation. Both the patches and the lumber might be dried in the same kiln if that is desirable or necessary but in each instance a definite control should be maintained thereover after removal from the kiln.

The gist of this invention, therefore, resides in the fact that the plugs and lumber, after being properly conditioned, are maintained substantially at that condition until assembled. Thus, it is possible to insure the integrity of the joints after the repaired pieces of lumber are put into use since change of atmospheric conditions affects both parts to the same extent.

While it has been generally understood in this description that the plugs or patch pieces are to be conditioned to contain a lesser percentage of moisture than the pieces to which they are to be applied, this is not always followed, for in some instances it may be permissible and also desirable to bring them to the same moisture content. It is not desirable, however, to allow the patch pieces to have a higher percentage of moisture than the pieces to which they are to be applied.

Having thus described our invention, what we claim as new therein and desire to secure by Letters Patent is—

1. The method of manufacturing lumber of the character described comprising, conditioning the board stock and the patch stock to bring each to a predetermined percentage of moisture content, with that of the patch stock equal to or less than that of the board stock, forming patch pieces from the patch stock of definite dimensions, forming recesses in the board stock of corresponding dimensions, and applying the patch pieces to said recesses prior to change in the dimensions of either by reason of atmospheric conditions different from that in which the stock is conditioned.

2. The method of manufacturing lumber of the character described comprising, conditioning the board stock and the patch stock to reduce each to a predetermined percentage of moisture content, removing the patch stock into an area of controlled atmospheric conditions, forming the patch stock into patch pieces of definite dimensions, removing the board stock from the kiln and substantially immediately thereafter recessing to accurate dimensions and applying the patch pieces thereto.

3. The method of manufacturing lumber comprising, treating the board stock and the patch stock in conditions of controlled atmosphere whereby each stock is brought to a definite and predetermined percentage of moisture content, forming patch pieces of predetermined dimensions from the patch stock while in its prepared condition and maintaining the pieces against change in their predetermined moisture content in an area of controlled atmospheric conditions, removing defects from the board stock while at its prepared condition by recessing to accurate dimensions corresponding to those of the patch pieces and then, substantially immediately thereafter, applying the patch pieces thereto.

4. The method of manufacturing lumber of the character disclosed, comprising, treating the board stock and the patch stock in controlled atmospheric conditions whereby each stock is brought to a definite and predetermined percentage of moisture content, forming patch pieces of predetermined dimensions from the patch stock while in its prepared condition and maintaining them against change in their predetermined moisture content in an area of controlled atmospheric conditions, removing defective portions from the board stock, while in its prepared condition, by recessing to accurate dimensions corresponding to those of the patch pieces, and finally applying the patch pieces to the recesses in an area of controlled atmospheric conditions.

5. The method of manufacturing lumber of the character described, comprising, kiln drying the board stock and the patch stock to reduce each to a predetermined percentage of moisture content, removing the patch stock into an area of controlled atmospheric conditions to maintain it against change from its prepared condition, forming the patch stock into patch pieces of definite dimensions and storing said pieces in the said controlled area, removing the board stock from the kiln into said area of controlled atmospheric conditions, and substantially immediately thereafter, recessing the board stock to accurate dimensions to receive the patch pieces and applying the patch pieces thereto.

6. The method of manufacturing lumber of the character described, comprising, kiln drying the board stock to reduce it to a predetermined percentage of moisture content, kiln drying the patch stock to reduce it to a slightly lesser percentage of moisture content, removing the patch stock into an area of controlled atmospheric conditions to maintain it against change from its prepared condition, forming patch pieces from said patch stock to accurate dimensions and storing said pieces until ready for use in said area, removing the board stock from the kiln into the area of controlled atmospheric conditions and immediately removing the defects therefrom by recessing to accurate dimensions to receive said patch pieces, and applying the prepared patch pieces to the recesses.

OLIVER P. M. GOSS.
WORTH C. GOSS.